US006519221B1

(12) United States Patent
Manalis et al.

(10) Patent No.: US 6,519,221 B1
(45) Date of Patent: Feb. 11, 2003

(54) HIGH-DENSITY DATA STORAGE USING ATOMIC FORCE MICROSCOPE

(75) Inventors: Scott Manalis, Santa Barbara, CA (US); Emily B. Cooper, Cambridge, MA (US); Calvin F. Quate, Stanford, CA (US)

(73) Assignees: Massachusetts Institute of Technology, Cambridge, MA (US); The Board of Trustees of Leland Stanford Junior University, Palo Alto, CA (US)

( * ) Notice: Subject to any disclaimer, the term of this patent is extended or adjusted under 35 U.S.C. 154(b) by 295 days.

(21) Appl. No.: 09/680,290

(22) Filed: Oct. 6, 2000

Related U.S. Application Data

(60) Provisional application No. 60/165,276, filed on Nov. 12, 1999.

(51) Int. Cl.[7] .................................................. G11B 7/00
(52) U.S. Cl. ........................................ 369/126; 250/306
(58) Field of Search ................................. 369/126, 100; 250/306, 307, 309, 310, 311

(56) References Cited

U.S. PATENT DOCUMENTS

| | | | | |
|---|---|---|---|---|
| 5,436,448 A | * | 7/1995 | Hosaka et al. | 250/306 |
| 5,537,372 A | * | 7/1996 | Albrecht et al. | 369/128 |
| 5,546,374 A | * | 8/1996 | Kuroda et al. | 369/126 |
| 6,101,164 A | * | 8/2000 | Kado et al. | 369/126 |

OTHER PUBLICATIONS

Avouris et al., "AFM–tip–induced and current–induced local oxidation of silicon and metals," *Applied Physics A 66*, pp. S659–S667 (1998).

Dai et al., "Exploiting the properties of carbon nanotubes for nanolithography," *Applied Physics Letters*, vol. 73, No. 11, pp. 1508–1510, Sep. 14, 1998.

Perez–Murano et al., "Voltage modulation scanned probe oxidation," *Applied Physics Letters*, vol. 75, No. 2, pp. 199–201, Jul. 12, 1999.

Mamin, "Thermal writing using a heated atomic force microscope tip," *Applied Physics Letters*, vol. 69, No. 3, pp. 433–435, Jul. 15, 1996.

Binnig et al., "Ultrahigh–density atomic force microscopy data storage with erase capability," *Applied Physics Letters*, vol. 74, No. 9, pp. 1329–1131, Mar. 1, 1999.

Terris et al., "Near–field optical data storage," *Applied Physics Letters*, vol. 68, No. 2, pp. 141–143, Jan. 8, 1996.

Sugimura et al., "Scanning Tunneling Microscope Tip–Induced Anodization for Nanofabrication of Titanium," *The Journal of Physical Chemistry*, vol. 98, No. 16, pp. 4352–4357, (1994).

Cui et al., "Perpendicular quantized magnetic disks with 45 Gbits on a 4×4cm$^2$ area," *Journal of Applied Physics*, vol. 85, No. 87, pp. 5534–5536, Apr. 15, 1999.

Wu et al., "Large area high density quantized magnetic disks fabricated using nanoimprint lithography," *Journal of Vacuum Science Technology B*, vol. 16, No. 6, pp. 3825–3829, Nov./Dec. 1998.

Krauss et al., Nano–compact disks with 400 Gbit/in$^2$ storage density fabricated using nanoimprint lithography and read with proximal probe, *Applied Physics Letters*, vol. 71, No. 21, pp. 3174–3176, Nov. 24, 1997.

(List continued on next page.)

*Primary Examiner*—Thang V. Tran
(74) *Attorney, Agent, or Firm*—Testa, Hurwitz & Thibeault, LLP

(57) ABSTRACT

An atomic force microscope (AFM) tipped with a single-wall conductive nanotube is operated to write bits onto a metal substrate by oxidizing the surface. The oxidized microregions project above an otherwise flat surface, and can therefore be detected—that is, the written bits can be read—using the same AFM arrangement.

22 Claims, 2 Drawing Sheets

Chui et al., "Low-stiffness silicon cantilevers for thermal writing and piezoresistive readback with the atomic force microscope," *Applied Physics Letters*, vol. 69, No. 18, pp. 2767–2769, Oct. 28, 1996.

Dagata, et al., "Modification of hydrogen–passivated silicon by a scanning tunneling microscope operating in air," *Applied Physics Letters*, vol. 56, No. 20, pp. 2001–2003, May 14, 1990.

Snow et al., "Fabrication of Si nanostructures with an atomic force microscope," *Applied Physics Letters*, vol. 64, No. 15, pp. 1932–1934, Apr. 11, 1994.

Barrett et al., "Charge storage in a nitride–oxide–silicon medium by scanning capacitance microscopy," *Journal of Applied Physics*, vol., 70, No. 5, pp. 2725–2733, Sep. 1, 1991.

Mamin et al., "Thermomechanical writing with an atomic force microscope tip," *Applied Physics Letters*, vol. 61, No. 8, pp. 1003–1005, Aug. 24, 1992.

Dagata et al., "Pattern generation on semiconductor surfaces by a scanning tunneling microscope operating in air," *Journal of Vacuum Science Technology B*, vol. 9, pp. 1384–1384, (1991).

Betzig et al., "Breaking the Diffraction Barrier: Optical Microscopy on a Nanometric Scale," Science, vol. 251, pp. 1468–1470 (1991).

\* cited by examiner

HIGH-DENSITY DATA STORAGE USING ATOMIC FORCE MICROSCOPE

PRIOR APPLICATION

This application stems from U.S. Provisional application Ser. No. 60/165,276, filed on Nov. 12, 1999.

FIELD OF THE INVENTION

The present invention relates to storage of information, and in particular to high-density computer storage.

BACKGROUND OF THE INVENTION

At present, the magnetic hard disk is the predominant device for mass data storage in microelectronics applications. The ever-growing demand for storage capacity has engendered dramatic increases in bit density and read/write speed, even as the price per stored megabyte has fallen. Whereas in 1990 the areal density of state-of-the-art hard disks was less than 0.1 Gbit/in$^2$, currently available disks may have areal densities in excess of 5 Gbits/in$^2$. It is expected that design scaling and the move toward giant magnetoresistive heads will push areal densities into the upper tens of Gbits/in$^2$. This growth rate cannot be sustained indefinitely, however, and conventional scaling is expected to peak in 2006. Of course, this technological limitation will not reduce the demand for greater storage capacity in less space.

Numerous alternatives to magnetic storage have been proposed. Nanoimprintation, for example, has been used to fabricate 400 Gbit/in$^2$ read-only (compact disc) devices and 45 Gbit/in$^2$ read-write devices (see Krauss et al., *Appl. Phys. Lett.* 71:3174 (1997); Wu et al., *J. Vac. Sci. Technol. B* 16:3825 (1998); and Cui et al., *J. Appl. Phys.* 85:5534 (1999)). Read-write heads based on scanning probes have achieved areal densities of 400 Gbit/in$^2$ (see Binnig et al., *Appl. Phys. Lett.* 74:1329 (1999); Mamin et al., *Appl. Phys. Lett.* 69:433 (1996); Chui et al., *Appl. Phys. Lett.* 69:2767 (1996)). Efforts have also been made to utilize scanning probe microscopes to store data by surface modification (see Betzig et al., *Science* 251:1486 (1991); Barret et al., *J. Appl. Phys. Lett.* 70:2725 (1991); and Terris et al., *Appl. Phys. Lett.* 68:141 (1996)). None of these techniques, however, has approached the current goal of a terabit per square inch.

While devices operating on the atomic or molecular scale surpass this threshold, they are generally not suited for commercial data storage due to stringent low-temperature requirements or the need to operate under vacuum conditions. For example, the cryogenic scanning tunneling microscope (STM) has been used to move single atoms (see Stroscio et al., *Science* 254:319 (1991)), and the vacuum STM to align $C_{60}$ molecules on copper lattices (see Cuveres et al., *Appl Phys. A* 66:S669 (1998)).

BRIEF SUMMARY OF THE INVENTION

The present invention utilizes an atomic force microscope (AFM) tipped with a single-wall conductive nanotube, and preferably operated in the "tapping" mode, to write bits onto a metal substrate by oxidizing the surface. The oxidized microregions project above an otherwise flat surface, and can therefore be detected—that is, the written bits can be read—using the same AFM arrangement.

In a preferred embodiment, the AFM tip is provided with a single-walled carbon nanotube, and is operated to oxidize an atomically flat titanium surface. Using this arrangement, bit densities of 1.6 Tbits/in$^2$ have been achieved. Moreover, the extreme hardness and cylindrical shape of the SWNT element avoids significant tip wear, thereby preventing bit degradation during the write process and minimizing tip convolution during read operations.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
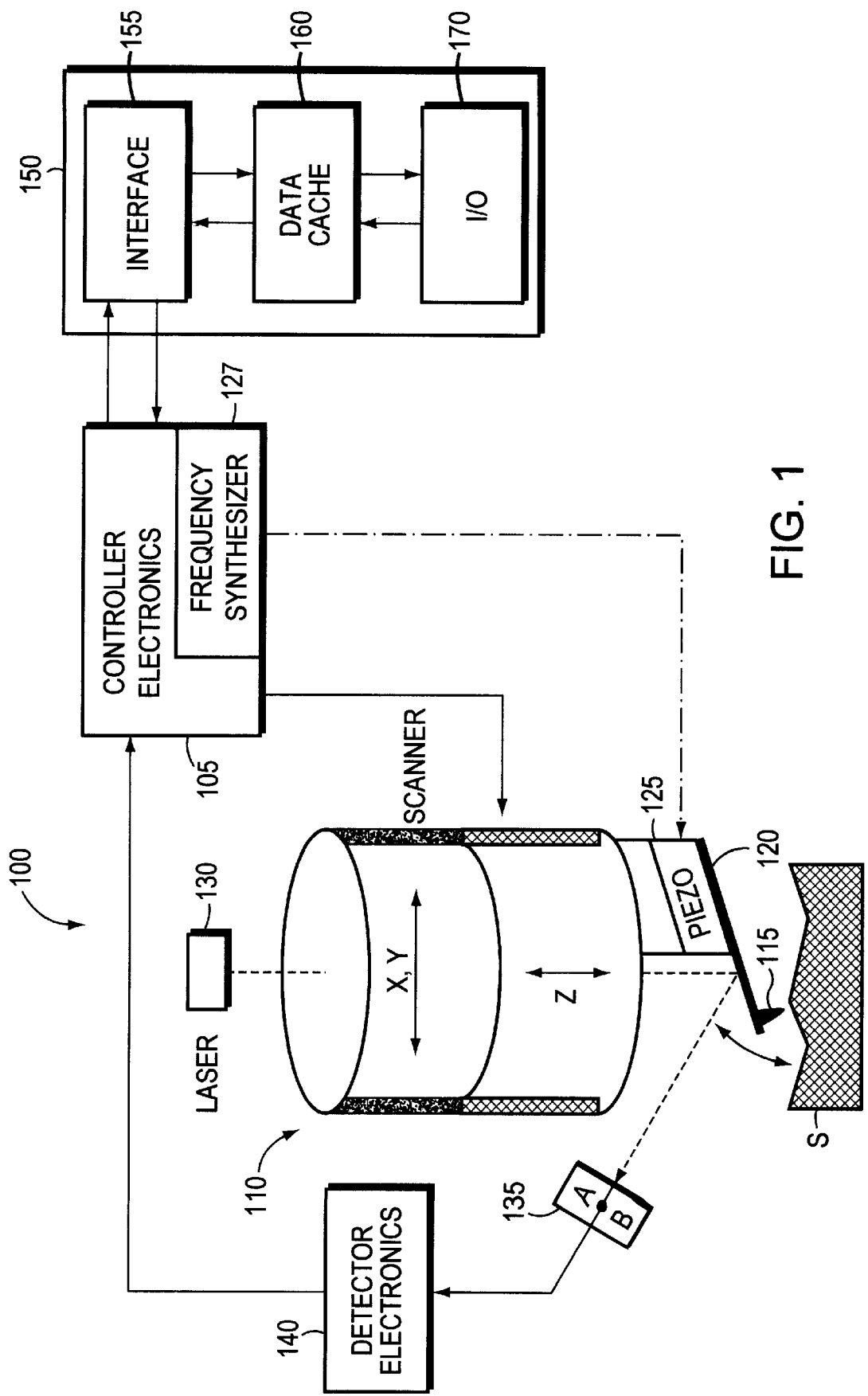
FIG. 1 schematically illustrates the approach of the present invention.

Refer first to FIG. 1, which illustrates a system 100 in accordance with the invention. A controller 105 operates an AFM head 110 in three dimensions over the surface of a substrate S. As illustrated, the surface of substrate S extends in the x,y plane, while movement toward and away from the surface occurs along the z axis. A typical scanner configuration may execute movement along the three axes using a series of independently operable piezo elements, which are united into a single tube. AFM head 110 comprises a cantilever 115, which terminates in a tip 120. A piezoelectric oscillator 125, itself operated by a frequency-synthesizer module 127 of controller 105, deflects cantilever 115 as indicated by the arrow as tip 120 passes over the substrate S. The instanteous degree of cantilever deflection is monitored by an optical arrangement comprising a laser 130, a split-photodiode detector 135, and a detector circuit 140. The output of detector 140 is fed back to controller 105.

An AFM can operate in any of three modes: contact mode, non-contact mode, and "tapping" mode. In contact mode, cantilever 120 is not actively deflected. Instead, the tip 115 contacts substrate S (actually, a thin layer of fluid adsorbed thereon) as it is scanned over the surface. Controller 105 moves AFM 110 head along the z axis in response to the detector signal in order to maintain a constant cantilever deflection as tip 115 is scanned over the changing surface topography. By virtue of this feedback loop, the force between tip 115 and the surface remains constant. To obtain an image of the topography of a surface, the changing z-axis position is recorded as the head is scanned over the surface.

In non-contact mode, piezo oscillator 125 deflects cantilever 120 at a frequency slightly above its resonance frequency, and typically with an amplitude of a few (<10) nm, to obtain an AC signal from cantilever 120. Tip 115 does not contact the sample surface, but oscillates above an adsorbed fluid layer. The detector feedback loop maintains a constant oscillation amplitude by moving the AFM head 110 along the z axis until a "setpoint" amplitude or frequency is reached.

In "tapping" mode, the form of operation preferred herein, cantilever 120 is oscillated at or near its resonance frequency with an amplitude ranging, typically, from 20 nm to 100 nm. For example, cantilever 120 may be 250 µm in length and composed of silicon, with a resonance frequency of 60–80 kHz; such elements are available from Digital Instruments, Santa Barbara, CA. Tip 115 lightly "taps" on the surface of substrate S during scanning, contacting the surface at the bottom of its oscillation excursion. The feedback loop maintains a constant oscillation amplitude by keeping the root mean square (RMS) amplitude of the detector signal constant, raising or lowering AFM head 110 as necessary. In this mode of operation, the surface need not have an adsorbed liquid film. Tapping mode reduces lateral forces and is well suited to the SWNT tip.

In accordance with the invention, bits are written by application of a voltage, via tip 115, to an oxidizable metal surface. For example, substrate S may be a thin film of titanium with a layer of water adsorbed on the surface thereof. Tip 115 is brought into close proximity to the substrate at the bottom of each excursion, and at points where data is to be written, a negative bias is applied to the tip. This produces a local oxidation of the surface, which is manifested as a small hump whose dimensions are determined chiefly by the tip diameter and the roughness of the substrate, but also by the field strength, the scanning rate, the tip-to-surface distance when voltage is applied, and the environment. The SWNT tips employed herein are capable of writing sub-10 nm features, and at the same time permit larger features to be written more reliably.

Figure 2:
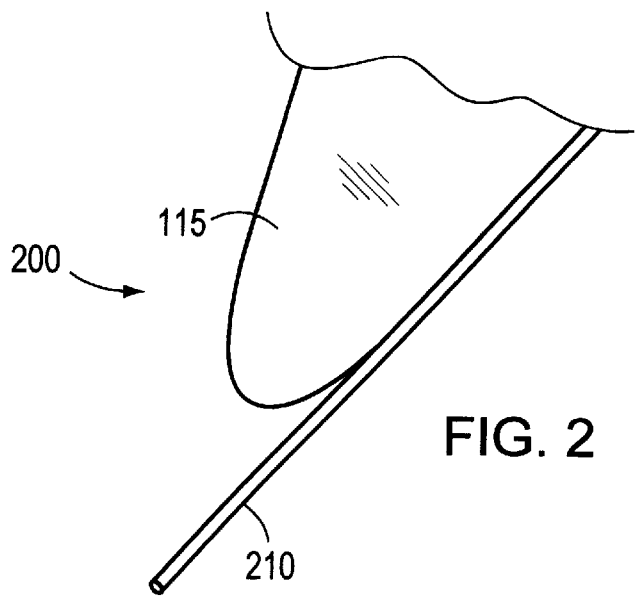
FIG. 2 is a detailed side view of a writing tip in accordance herewith.

Such a tip, indicated generally at 200, is illustrated in FIG. 2. The tip 200 is based on a commercially available tip 115 as described above, but projecting from the terminus of tip 115 is a SWNT 210. The SWNT is preferably <5 nm in diameter, and suitable carbon nanotube tips may be synthesized by chemical vapor deposition (CVD) on a commercial silicon cantilever 120 and tip 115. A catalyst solution to promote SWNT growth is prepared by hydrolyzing $FeCl_3$ in ethanol to produce iron oxide. A supporting gel matrix is formed of aluminum and silicon oxides, and molybdenum oxide used as a promoter. The tip is dipped in the catalyst solution and then exposed to CVD of $CH_4$ at 900° C. Since the catalyst coats the entire surface of the cantilever tip, nanotubes grow at many sites and follow the contour of the surface. The sharp discontinuity at the pyramidal terminus of tip 115 allows the nanotube to extend beyond the surface, sometimes by more than a micron.

Tips prepared by this process often feature a single nanotube extending from the cantilever pyramid, although multiple nanotubes sometimes form small bundles. In general, SWNTs range in length from a few nanometers to over a micron. After synthesis, most tips must be trimmed in order to isolate a single nanotube less than 65 nm long that is suitable for reliable imaging and writing. A tip that is too long will either buckle during writing, producing excessively wide features, or will traverse the surface with a slip-stick motion, producing intermittent oxidation.

Nanotube tips may be shortened by applying a series of 500 $\mu$s voltage pulses ranging from 20 V to 60 V between the nanotube and a metal (e.g., titanium) surface. During the tip-shortening process, a commercial AFM is used to measure the (i) the RMS amplitude of the detection signal and (ii) the deflection of the cantilever as a function of tip-surface separation. The cantilever 120 is driven at resonance while it is also scanned over the substrate (in a direction orthogonal thereto). The scan range of the tip-surface separation is adjusted so that the tip only contacts the surface for the last ~10 nm of the scan.

Figure 3:
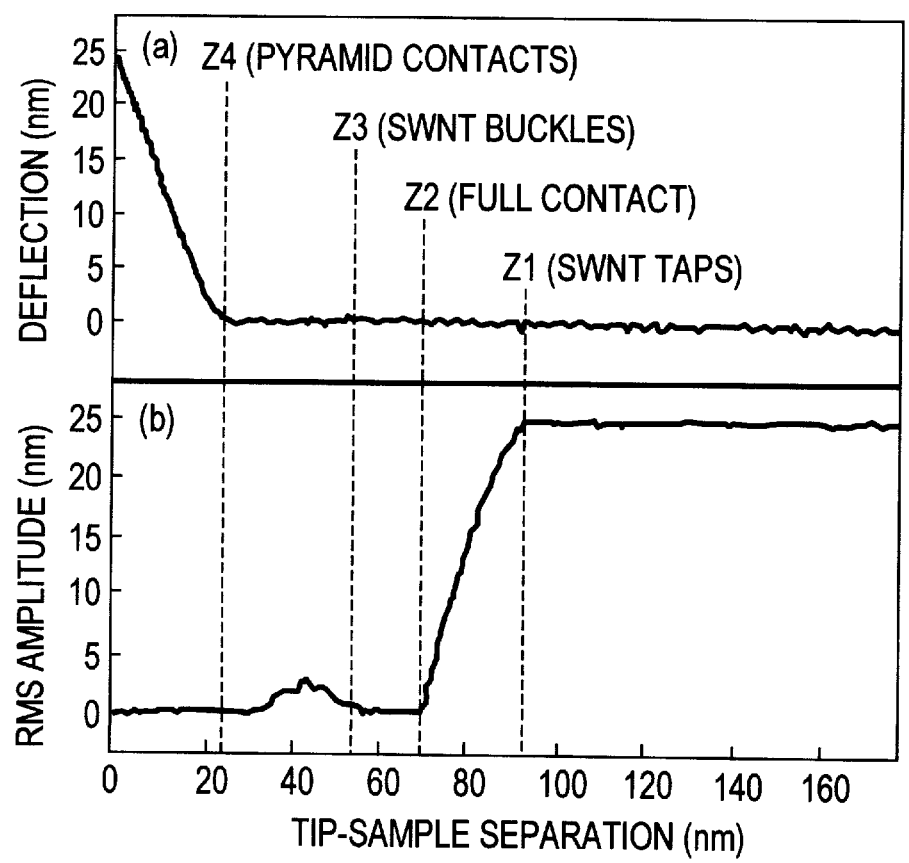
FIG. 3 graphically illustrates measurement of SWNT tip length.

FIG. 3 shows the response from a nanotube that has been shortened to ~45 nm. When the tip is far from the surface, the cantilever oscillates freely. As the tip is brought into contact with the surface (Z1), the oscillation amplitude is reduced until the tip is in full contact with the surface (Z2), at which point the RMS amplitude is zero. The tip is then lowered another 15 nm toward the surface until the SWNT buckles (Z3). The length of the nanotube—i.e., its extension beyond the cantilever terminus—is given by the difference in distance between the point where contact is first made and the point where the cantilever terminus actually makes contact with the surface so the cantilever deflects linearly (that is, Z2–Z4).

A preferred substrate is a 2 nm-thick conformal layer of titanium on an atomically flat $\alpha$-$Al_2O_3$ surface. Such a surface may be prepared by first cleaning an $\alpha$-$Al_2O_3$ surface with an organic solvent, followed by annealing in air at 1100° C. for 30 min. A 2-nm layer of titanium metal is then evaporated onto the $\alpha$-$Al_2O_3$ surface at a rate of 1 Å/s at~$10^{-8}$ torr.

Our preferred substrate has a surface roughness of approximately 1 Å, which is important for two reasons. First, this degree of smoothness allows for consistent, repeatable surface patterning. Extreme discontinuities cause sticking and deformation of patterned features. Second, since the average height of the titanium oxide bits is approximately 1 nm, high surface roughness can cause ambiguity in reading features.

With renewed reference to FIG. 1, the system 100 includes a data-handling circuit 150 that orchestrates read and write operations and facilitates communication with standard or non-standard computer bus architectures. An interface module 155 sends commands to controller 105, causing tip 115 to be brought adjacent a desired point on substrate S and to execute a read or write operation. When writing, tip 115 receives a 5 kHz square wave of +0.5 V and −9.5 V. Low voltages will not induce oxidation, while very high voltages will produce excessively large features. An average tip velocity of 100 $\mu$m/s may be used to produce 8-nm bits at a 20-nm pitch, which is equivalent to a bit density of 1.6 Tbits/$in^2$. Using this approach, writing operations were performed at a rate of 5 kbits/s; although slow, this rate can be significantly improved through the use of multiple AFM heads. When reading, AFM head 110 is used to sense the presence or absence of a feature at each location of interest.

A data cache 160 directs the writing of data in write mode, and stores acquired data in read mode. The data, in turn, is received from or sent to a computer by means of an input/output module 170. The computer's disk-operating system determines the physical locations at which data is to be written or read, and interface 155 causes the appropriate movement and operation of AFM head 110.

Although the present invention has been described with reference to specific details, it is not intended that such details should be regarded as limitations upon the scope of the invention, except as and to the extent that they are included in the accompanying claims.

What is claimed is:

1. A method of creating a pattern of bits using an atomic force microscope, the method comprising the steps of:
    a. providing a nanometer-scale atomic force microscope tip;
    b. providing a conformal layer of metal having a surface roughness of about 1 Å; and
    c. scanning the tip over the metal surface and patterning a series of features onto the surface by applying a voltage to the tip, the voltage inducing oxidation of the metal surface.

2. The method of claim 1 wherein the oxidation produces a detectable physical feature.

3. The method of claim 1 wherein the surface is a conformal layer of titanium metal applied on an atomically flat $\alpha$-$Al_2O_3$ surface.

4. The method of claim 1 wherein the voltage is a 5 kHz square wave of +0.5 V and −9.5 V.

5. The method of claim 1 wherein, during the scan, the tip is oscillated in a tapping mode whereby the tip contacts the surface at a bottom point each oscillation.

6. The method of claim 1 wherein the tip comprises a single-walled nanotube.

7. The method of claim 6 wherein the nanotube is carbon.

8. The method of claim 6 wherein the nanotube is generally cylindrical, having a diameter <5 nm and a length no greater than 65 nm.

9. The method of claim 6 wherein the nanotube projects from a silicon atomic-force microscope cantilever tip.

10. The method of claim 9 wherein the nanotube is synthesized by chemical vapor deposition onto the silicon cantilever tip and subsequently shortened.

11. The method of claim 1 wherein the series of features has an areal density in excess of 1 Tbit/in$^2$.

12. A data-storage device comprising:
  a. a nanometer-scale atomic force microscope tip;
  b. a substrate comprising a conformal layer of metal having a surface roughness of about 1 Å; and
  c. a scanner arrangement for scanning the tip over the metal surface; and
  d. a controller for causing the tip to pattern a series of features onto the surface by applying a voltage to the tip at selected points during the scan, the voltage inducing oxidation of the metal surface.

13. The device of claim 12 wherein the oxidation produces a detectable physical feature.

14. The device of claim 12 wherein the surface is a conformal layer of titanium metal applied on an atomically flat $\alpha$-$Al_2O_3$ surface.

15. The device of claim 12 wherein the voltage applied by the controller is a 5 kHz square wave of +0.5 V and −9.5 V.

16. The device of claim 12 further comprising an oscillator for vibrating the tip in a tapping mode during the scan, whereby the tip contacts the surface at a bottom point each oscillation.

17. The device of claim 12 wherein the tip comprises a single-walled nanotube.

18. The device of claim 17 wherein the nanotube is carbon.

19. The device of claim 17 wherein the nanotube is generally cylindrical, having a diameter <5 nm and a length no greater than 65 nm.

20. The device of claim 17 wherein the nanotube projects from a silicon atomic-force microscope cantilever tip.

21. The device of claim 20 wherein the nanotube is synthesized by chemical vapor deposition onto the silicon cantilever tip and subsequently shortened.

22. The device of claim 12 wherein the series of features has an areal density in excess of 1 Tbit/in$^2$.

* * * * *